United States Patent
Jones et al.

(10) Patent No.: US 10,237,232 B2
(45) Date of Patent: *Mar. 19, 2019

(54) GEOCODING WITH GEOFENCES

(71) Applicant: GeoFrenzy, Inc., Tiburon, CA (US)

(72) Inventors: Benjamin T. Jones, Henderson, NV (US); Bennett Hill Branscomb, Ingleside, TX (US)

(73) Assignee: GEOFRENZY, INC., Tiburon, CA (US)

(*) Notice: Subject to any disclaimer, the term of this patent is extended or adjusted under 35 U.S.C. 154(b) by 282 days.

This patent is subject to a terminal disclaimer.

(21) Appl. No.: 15/209,211

(22) Filed: Jul. 13, 2016

(65) Prior Publication Data

US 2016/0323241 A1 Nov. 3, 2016

Related U.S. Application Data

(63) Continuation-in-part of application No. 14/811,234, filed on Jul. 28, 2015, now Pat. No. 10,121,215, which is a continuation-in-part of application No. 14/745,951, filed on Jun. 22, 2015, now Pat. No. 9,906,609, which is a continuation-in-part of application No. 14/728,259, filed on Jun. 2, 2015, now Pat. No. 9,363,638, said application No. 14/811,234 is a continuation-in-part of application No. 14/755,669, filed on Jun. 30, 2015, now Pat. No. 9,906,902, which is a continuation-in-part of (Continued)

(51) Int. Cl.
*H04L 9/08* (2006.01)
*H04L 29/12* (2006.01)
*G06Q 50/16* (2012.01)
*G06F 17/30* (2006.01)

(52) U.S. Cl.
CPC .... *H04L 61/2007* (2013.01); *G06F 17/30312* (2013.01); *G06Q 50/167* (2013.01); *H04L 9/088* (2013.01); *H04L 61/1511* (2013.01); *H04L 61/609* (2013.01)

(58) Field of Classification Search
CPC ..... H04L 67/2842; H04L 65/60; H04L 9/088; G06F 12/0813; G06F 2212/455; G06F 17/30312; G06Q 50/167
See application file for complete search history.

(56) References Cited

U.S. PATENT DOCUMENTS 6,844,990 B2  1/2005  Artonne et al.
6,865,028 B2  3/2005  Moustier et al.
(Continued)

OTHER PUBLICATIONS

Christian Maihofer, "A Survey of Geocast Routing Protocols," IEEE Communications Surveys Second Quarter 2004, vol. 6, No. 2, pp. 32-42 (2004).

(Continued)

*Primary Examiner* — Philip J Chea
*Assistant Examiner* — Wuji Chen
(74) *Attorney, Agent, or Firm* — Neo IP

(57) ABSTRACT

Systems and methods of registering geocodes with a geofence and delivering geocodes which define geofences to devices are described herein. Geocodes include strings of words, letters, numbers, and combinations thereof. Geocodes associated with the same or similar geofences are cohesive and provide for improved location information.

9 Claims, 14 Drawing Sheets

Related U.S. Application Data application No. 14/728,259, filed on Jun. 2, 2015, now Pat. No. 9,363,638, which is a continuation-in-part of application No. 14/745,951, filed on Jun. 22, 2015, now Pat. No. 9,906,609, said application No. 14/811,234 is a continuation-in-part of application No. 14/740,557, filed on Jun. 16, 2015, now Pat. No. 9,280,559, which is a continuation of application No. 14/728,259, filed on Jun. 2, 2015, now Pat. No. 9,363,638, application No. 15/209,211, which is a continuation-in-part of application No. 14/953,485, filed on Nov. 30, 2015, now Pat. No. 9,875,251, which is a continuation-in-part of application No. 14/728,259, filed on Jun. 2, 2015, now Pat. No. 9,363,638, and a continuation-in-part of application No. 14/745,951, filed on Jun. 22, 2015, now Pat. No. 9,906,609, application No. 15/209,211, which is a continuation-in-part of application No. 15/007,661, filed on Jan. 27, 2016, now Pat. No. 9,396,344, which is a continuation of application No. 14/740,557, filed on Jun. 16, 2015, now Pat. No. 9,280,559, which is a continuation of application No. 14/728,259, filed on Jun. 2, 2015, now Pat. No. 9,363,638, application No. 15/209,211, which is a continuation-in-part of application No. 14/745,951, filed on Jun. 22, 2015, now Pat. No. 9,906,609, which is a continuation-in-part of application No. 14/728,259, filed on Jun. 2, 2015, now Pat. No. 9,363,638, application No. 15/209,211, which is a continuation-in-part of application No. 14/755,669, filed on Jun. 30, 2015, now Pat. No. 9,906,902, which is a continuation-in-part of application No. 14/745,951, filed on Jun. 22, 2015, now Pat. No. 9,906,609, which is a continuation-in-part of application No. 14/728,259, filed on Jun. 2, 2015, now Pat. No. 9,363,638.

(60) Provisional application No. 62/030,252, filed on Jul. 29, 2014.

(56) References Cited

U.S. PATENT DOCUMENTS

| | | | |
|---|---|---|---|
| 6,885,817 | B2 | 4/2005 | Artonne et al. |
| 6,895,180 | B2 | 5/2005 | Artonne et al. |
| 6,920,129 | B2 | 7/2005 | Preston et al. |
| 7,498,985 | B1 | 3/2009 | Woo et al. |
| 7,525,933 | B1 | 4/2009 | Hall |
| 7,613,467 | B2 | 11/2009 | Fleischman |
| 7,865,416 | B1 | 1/2011 | Graff et al. |
| 8,016,426 | B2 | 9/2011 | Artonne et al. |
| 8,052,081 | B2 | 11/2011 | Olm et al. |
| 8,103,567 | B1 | 1/2012 | Graff et al. |
| 8,149,801 | B2 | 4/2012 | Hall |
| 8,285,628 | B1 | 10/2012 | Graff et al. |
| 8,292,215 | B2 | 10/2012 | Olm et al. |
| 8,346,578 | B1 | 1/2013 | Hopkins et al. |
| 8,483,652 | B2 | 7/2013 | Hall |
| 8,493,207 | B2 | 7/2013 | Diem |
| 8,510,190 | B1 | 8/2013 | Graff et al. |
| 8,588,818 | B2 | 11/2013 | Huang et al. |
| 8,634,804 | B2 | 1/2014 | McNamara et al. |
| 8,717,166 | B2 | 5/2014 | Diem |
| 8,753,155 | B2 | 6/2014 | Olm et al. |
| 8,812,027 | B2 | 8/2014 | Obermeyer et al. |
| 8,837,363 | B2 | 9/2014 | Jones et al. |
| 8,880,101 | B2 | 11/2014 | Fraccaroli |
| 8,991,740 | B2 | 3/2015 | Olm et al. |
| 9,071,931 | B2 | 6/2015 | Diem |
| 9,280,559 | B1 | 3/2016 | Jones |
| 9,363,638 | B1 | 6/2016 | Jones |
| 2001/0015965 | A1* | 8/2001 | Preston ............... G01S 5/0027 370/338 |
| 2002/0035432 | A1 | 3/2002 | Kubica et al. |
| 2003/0036949 | A1* | 2/2003 | Kaddeche ............ G06Q 30/02 705/14.39 |
| 2004/0148294 | A1 | 7/2004 | Wilkie et al. |
| 2007/0220038 | A1 | 9/2007 | Crago |
| 2008/0291318 | A1 | 11/2008 | Artonne et al. |
| 2010/0044499 | A1 | 2/2010 | Dragan et al. |
| 2010/0198714 | A1* | 8/2010 | Orfano ................. G06Q 20/10 705/35 |
| 2011/0105151 | A1 | 5/2011 | Hall |
| 2011/0136468 | A1* | 6/2011 | McNamara .......... G06Q 20/14 455/406 |
| 2011/0208797 | A1 | 8/2011 | Kim |
| 2012/0102489 | A1* | 4/2012 | Staiman ............. G06Q 10/0631 718/1 |
| 2012/0172027 | A1* | 7/2012 | Partheesh ............. H04W 4/021 455/420 |
| 2012/0265685 | A1 | 10/2012 | Brudnicki et al. |
| 2013/0091016 | A1 | 4/2013 | Shutter |
| 2013/0225196 | A1 | 8/2013 | James et al. |
| 2013/0267196 | A1 | 10/2013 | Leemet et al. |
| 2013/0314398 | A1 | 11/2013 | Coates et al. |
| 2014/0057648 | A1 | 2/2014 | Lyman et al. |
| 2014/0100900 | A1* | 4/2014 | Abhyanker ............ H04L 67/18 705/5 |
| 2014/0171013 | A1 | 6/2014 | Varoglu et al. |
| 2014/0208397 | A1 | 7/2014 | Peterson |
| 2014/0248887 | A1 | 9/2014 | Alkabra et al. |
| 2014/0282829 | A1 | 9/2014 | Dabbiere et al. |
| 2014/0295944 | A1 | 10/2014 | Faircloth |
| 2014/0335823 | A1 | 11/2014 | Heredia et al. |
| 2014/0339355 | A1 | 11/2014 | Olm et al. |
| 2014/0340473 | A1 | 11/2014 | Artonne |
| 2015/0031398 | A1 | 1/2015 | Rahnama |
| 2015/0087263 | A1 | 3/2015 | Branscomb |
| 2015/0099461 | A1* | 4/2015 | Holden ................ G01C 21/367 455/39 |
| 2015/0134143 | A1* | 5/2015 | Willenborg .......... G05D 1/0094 701/2 |
| 2015/0172862 | A1 | 6/2015 | Kau et al. |
| 2015/0281507 | A1 | 10/2015 | Konen et al. |
| 2016/0007156 | A1 | 1/2016 | Chiou et al. |
| 2016/0073225 | A1 | 3/2016 | Ganesalingam et al. |
| 2016/0169696 | A1* | 6/2016 | Butts, III .......... G01C 21/3476 701/438 |
| 2016/0357782 | A1 | 12/2016 | Jones |
| 2016/0359986 | A1 | 12/2016 | Jones |
| 2016/0360360 | A1 | 12/2016 | Jones |

OTHER PUBLICATIONS

Robert Barr, What 3 Words, Mar. 2015, v1.1, Lymm, Cheshire, UK.

* cited by examiner 3d model overview

GEOCODING WITH GEOFENCES

CROSS-REFERENCE TO RELATED APPLICATIONS

The present application claims priority to one or more co-pending prior filed applications. This application claims priority to U.S. patent application Ser. No. 14/745,951, filed Jun. 22, 2015, which is a continuation-in-part of U.S. patent application Ser. No. 14/728,259, filed Jun. 2, 2015, now U.S. Pat. No. 9,363,638, each of which is hereby incorporated by reference in its entirety. This application also claims priority to U.S. patent application Ser. No. 14/755,669 filed Jun. 30, 2015, which is a continuation-in-part of U.S. patent application Ser. No. 14/728,259, filed Jun. 2, 2015, now U.S. Pat. No. 9,363,638, and a continuation-in-part of U.S. patent application Ser. No. 14/745,951, filed Jun. 22, 2015, which is a continuation-in-part of U.S. patent application Ser. No. 14/728,259, filed Jun. 2, 2015, now U.S. Pat. No. 9,363,638, each of which is hereby incorporated by reference in its entirety. This application also claims priority to U.S. patent application Ser. No. 14/811,234 filed Jul. 28, 2015, which claims priority from U.S. Provisional Application Ser. No. 62/030,252, filed Jul. 29, 2014, and is also a continuation-in-part of U.S. patent application Ser. No. 14/755,669, filed Jun. 30, 2015, which is a continuation-in-part of U.S. patent application Ser. No. 14/745,951, filed Jun. 22, 2015, which is a continuation-in-part of U.S. patent application Ser. No. 14/740,557, filed Jun. 16, 2015, now U.S. Pat. No. 9,280,559, which is a continuation-in-part of U.S. patent application Ser. No. 14/728,259, filed Jun. 2, 2015, now U.S. Pat. No. 9,363,638, each of which is hereby incorporated by reference in its entirety. This application also claims priority to U.S. patent application Ser. No. 14/953,485 filed Nov. 30, 2015, which is a continuation in-part-of U.S. patent application Ser. No. 14/745,951 filed Jun. 22, 2015, which is a continuation in-part-of U.S. patent application Ser. No. 14/728,259, filed Jun. 2, 2015, now U.S. Pat. No. 9,363,638, each of which is hereby incorporated by reference in its entirety. This application also claims priority to U.S. patent application Ser. No. 15/007,661, filed Jan. 27, 2016, which is a continuation of U.S. patent Ser. No. 14/740,557, filed Jun. 16, 2015, now U.S. Pat. No. 9,280,559, which is a continuation of U.S. patent application Ser. No. 14/728,259, filed Jun. 2, 2015, now U.S. Pat. No. 9,363,638, each of which is hereby incorporated by reference in its entirety. Each of the above listed priority documents is incorporated herein by reference in its entirety.

BACKGROUND OF THE INVENTION

1. Field of the Invention

The present invention relates generally to geocoding with geofences where geocodes are references to locations and geofences associate a plurality of geocodes in a database, wherein each geocode is associated with an IP address.

2. Description of the Prior Art

Geocoding

Methods for referencing locations is well known in the prior art. An indirect reference to a location is a geocode. Examples of geocodes include street addresses, zip codes, and coordinate points. The translation process of de-referencing a geocode into a location is geocoding. The opposite process of looking up or generating a geocode based on a location is reverse-geocoding. Some geocodes dereference to a coordinate point while others dereference to areas. An example of geocoding of coordinates is ISO6707, the international standard representation of geographic point location by coordinates. In contrast, an example of geocoding that resolves to an area is ISO3166, the international standard for representation of names of countries and their subdivisions.

A variety of systems and methods for geocoding and reverse geocoding have been developed. For example, in the what3words implementation of geocodes a combination of three words is used to address every 3 m by 3 m square on earth. Alternative geocoding techniques include but are not limited to: MapCode, Geohex, Loc8code, and Open Postcode.

SUMMARY OF THE INVENTION

The present invention is directed to a geocoding solution using geofences to relate geocodes to each other and to locations. By associating geocodes with geofences there is improved location accuracy and naming cohesion.

Mechanisms for geocoding have varying abilities to accurately map geocodes to particular locations. The present invention includes associating geocodes with geofences to gain control over naming, defining, and attaching metadata to geocodes, and thereby relating geocodes to each other and to locations in a more meaningful way.

One embodiment of the present invention includes a method for registering geocodes with a geofence including: defining a geofence in a database of geofences using a plurality of geocodes, wherein a plurality of geocodes are determined from at least one latitude and longitude point; assigning a plurality of unique Internet protocol (IP) addresses to the plurality of geocodes defining the geofence such that each geocode is assigned a unique IP address; and storing the plurality of geocodes and the assigned unique IP address of each of the plurality of geocodes in the database of geofences, wherein at least one of the plurality of unique IP addresses assigned to the plurality of geocodes is encoded as at least one anchor point of the geofence, wherein the at least one anchor point of the geofence is a unique identifier of the geofence, wherein the plurality of unique IP addresses are Internet Protocol version 6 (IPv6) addresses, and wherein the at least one of the plurality of unique IP addresses that is encoded as the at least one anchor point of the geofence includes location data and metadata, wherein the metadata includes at least one of classes, entitlements, and lookup table identifiers, wherein the metadata are operable to be redefined via the lookup table identifiers.

Another embodiment of the present invention includes a geocode delivery system, including: at least one device having a graphical user interface (GUI), and a processor coupled with a memory, constructed and configured for wireless communication and programmed to include a fencing agent operable to send a request for geofence information over a network to at least one server computer associated with at least one geofence; at least one geofence having an anchor point identified by a unique Internet Protocol (IP) address or a unique IPv6 address; a plurality of geocodes linked to the geofence and assigned a plurality of the unique IPv6 addresses; and a Domain Name Service (DNS), wherein a domain name is assignable to each IPv6 address for each the plurality of geocodes and/or the anchor point of the geofence, wherein the GUI is operable to display a response to the request in real-time or near real-time, and wherein the plurality of geocodes are translatable to coordinate points of a geographic location and the IP address.

These and other aspects of the present invention will become apparent to those skilled in the art after a reading of the following description of the preferred embodiment when considered with the drawings, as they support the claimed invention.

DETAILED DESCRIPTION

Figure 1:
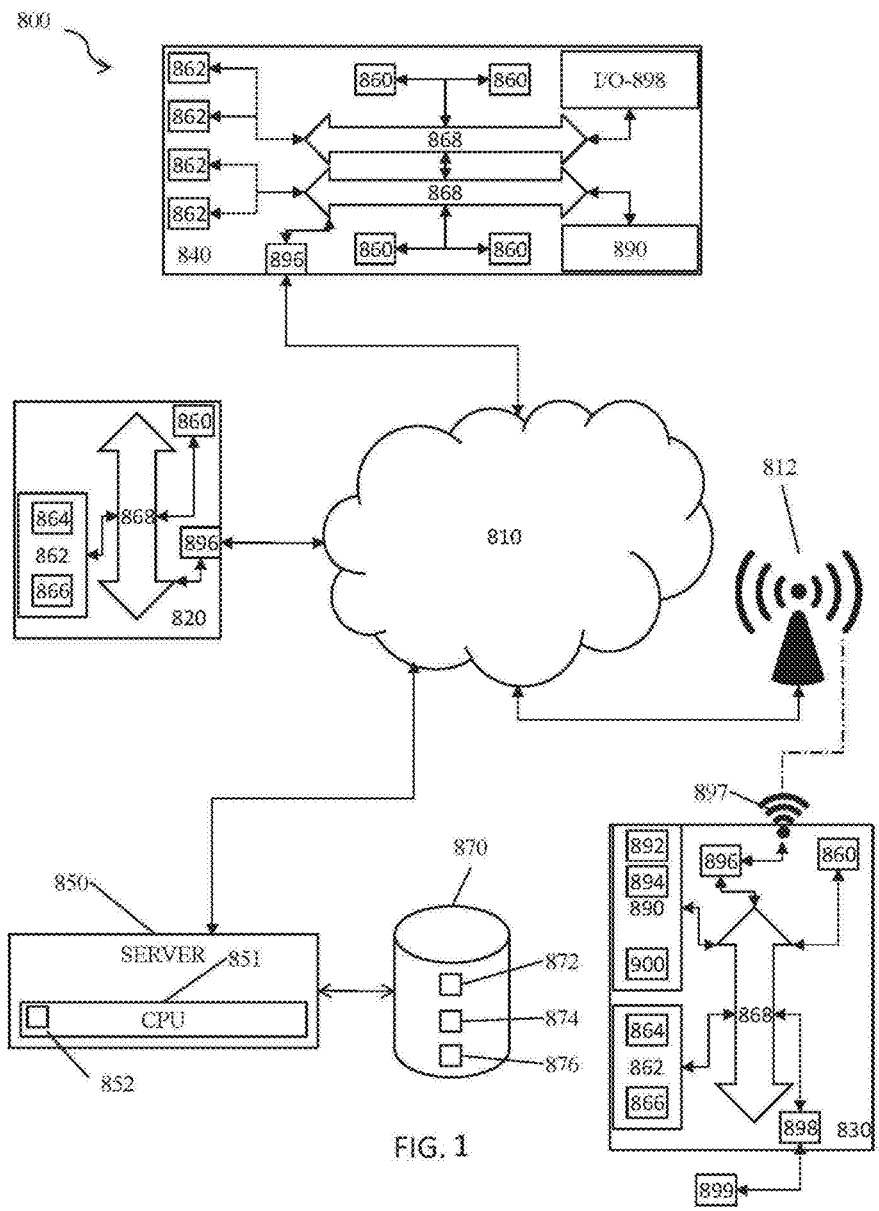
FIG. 1 is a schematic diagram illustrating a virtualized computing network used in one embodiment of the present invention.

The present invention is directed to methods and systems of geocoding with a geofence. Geocodes are stored in a database with geofences. Geofences are defined using a plurality of geocodes in a database and each geocode is associated with an IP address. The database also includes relevant information associated with the geofence, such as the owner, any licensees, entitlements, and a class of the geofence.

Preferably, the information describing each geofence includes at least one of an indication whether the geofence is verified or unverified, a class of the geofence, an entitlement of the geofence, a time-to-live value, and a context summary of the geofence. Preferably, metadata is distributed in response to forward Domaim Name Service (DNS) queries and reverse DNS queries.

Current GPS applications geocode a street address for an apartment complex as a coordinate point in the middle of the building. An application program utilizing geocodes therefore may incorrectly route a driver to a street behind the apartment complex. This problem is solved by the present invention by associating geocodes with geofences that define locations more precisely. In the present invention, geocodes encoded using interne protocols such as IPv6 provide added accuracy over traditional geocoding techniques.

Incorporated herein by reference in its entirety is the pending U.S. application 2016/0073225 by Ganesalingham et al., published on Mar. 10, 2016, which describes a geocoding method and is currently assigned to What3Words Limited. Also incorporated by reference in its entirety is the "what3words Technical Appraisal" by Robert Barr version 1.1 dated Mar. 15, 2015 and accessed on Jun. 15, 2016 at: https://www.dropbox.com/s/u4lpy7y3qh4ei7q/what3words %20-%20Technical %20Appraisal %20V1.1.pdf7dl=0.

In an example using what3words, a geocode comprised of three words can define a specific 3 m by 3 m location such as "plummets.displays.already". The advantage of this geocoding scheme is that humans can easily remember three words versus a set of numbers and letters or an IP address. In this example, the following words are used to address the area around the 3 m by 3 m square: "speeding.instants.consumers", "commics.unwashed.essays", "spoiled.tampering.perfected", "snowflakes.adjourn.tagline", "idler.screeshed.downbeat", "undergone.regret.accepts", "estimates.corporations.laptop", and "communicated.antlers.clone". In one example, taken together these squares describe an office location. Using 9 triplets of words may not be practical for a human to remember, making it unlikely that this geocoding scheme can be effectively used to describe an office location. However, the present invention provides for associating geocodes with an anchor geocode for a geofence, which allows for an area to be addressed cohesively. Furthermore, in a preferred embodiment of the invention, each geocode has an IP address which is preferably associated with a human readable name.

In the embodiments of this invention, geographic designators are geocodes. In one embodiment, geofences are made up of any type of geocode that refers to an area or a point. The geocodes are preferably operable to be directly translated via by lookup or by a code requiring algorithmic translation. The types of geocodes which make up of the geofence are application specific in one embodiment. For example, an application for an on demand ride-share such as Uber uses geocodes for designating geofences where high demand is currently present. For geofences of this size, geocodes comprised of three words are used in one embodiment since the resolution of the codes are 3 m by 3 m which works for the scale of creating the geofence for this particular application. However, more precision is advantageous in defining geofences using geocodes. In another application, for example, creating geofences to precisely demarcate property lines, a geocode such as ISO6707 is more appropriate since it offers more precision. The mechanism for defining fences with geocodes is independent of geocode type. In this embodiment, applications can determine which geocodes are to use for the particular zoom level that is appropriate.

Another embodiment of the present invention includes referencing a geocode with its association to a geofence using a cohesive name. In a preferred embodiment, geocodes defining geofences are encoded using IPv6 or a variation thereof. In another preferred embodiment, one geocode acts as an anchor for the geofence. The anchor geocode has an IP address that relates the name of the fence to the anchor point. The anchor geocode is also named and dereferences to the geofence when the geofence has registered the geocode as the anchor.

There are known mechanisms for associating names and IP addresses using Doman Name Service (DNS). For purposes of illustration, suppose a geofence is registered for the property line defining a residential property. The geocode for a point on the driveway may be designated as the anchor. Continuing with the example and using the naming functionality of DNS, the anchor geocode for an office location may be "plummets.displays.already". Once the geocode is associated with a geofence, the domain name of the office location may be automatically generated and registered with the geofence as plummets-displays-already.com. This provides for human and computer readable addressability of the geocode that translates to an IP address and also precisely defines an area specific to the geocode through association with a geofence. In one embodiment the geocode is the domain name: plummets-displays-already.com and the domain name dereferences to the geofence when the geocode is registered as the anchor point. In one embodiment, geofences for which the geocode intersects with are dynamically addressable through subdomain names. For example, pncarena.plummets-displays-already.com uses pncarean as the geofence name and subdomain name and plummets-displays-already.com as the geocode and subdomain name. In another embodiment the geocode is a subdomain related to the name of the fence: plummet-displays-already.pncareana.com, where pncarena is the name of the fence defining a sports stadium and plummet-displays-already is a specific point or place associated with the geofence of pnc arena. Applications of domain naming and subdomain naming include the ability for humans and machines to dereference locations as points that are relevant to the application (geocodes), areas that are relevant to applications (geofences), machine addressable client-server request/response capabilities associated with IP addresses linked to geocodes.

One embodiment of the present invention is a method of creating and/or registering a geofence. The geofence is stored in a database with the fence points defined by geocodes. In this embodiment, at least one device having a processor coupled with memory, constructed and configured for wireless communication, and programmed to include a fencing agent (FA) operable to query for geofence information over a network to at least one server computer, including the steps of generating a request for geofence information for a region of interest (ROI) and receiving near real-time geofence information corresponding to the ROI, wherein the geofence information includes identification of one geofence. In this embodiment, geofences can be associated in the database to be referenced by an anchor geocode. Also, the registered geofence and geocodes are associated with entitlements, classes, and/or licenses; and a geofence manager module for implementing rules on the at least one device; wherein the geofence manager module is operable to confirm and/or activate at least one license associated with the geofence in the geofence database.

In one embodiment, geocodes are stored as metadata utilizing IPv6 and DNS. For example, consider 000307aab18d03fe.blunt-chips-angle.geofrenzy.com where 000307aab18d03fe identifies the location, blunt-chips-angle identifies the what3words geocode, and geofrenzy.com identifies the domain. In another embodiment, geocodes are stored in a DNS Resource Record (RR) defining as points for a geofence referenced by an anchor point for the geofence or anchor geocode.

Preferably, the first request is a DNS query and the response is a DNS response. In one embodiment, the step of converting the geocode to the IP address comprises querying a geofence database with data stored thereon for IP addresses, anchor points for geofences, and geocodes. In another embodiment, the step of identifying one or more geofences comprises querying a geofence database, wherein the geofence database stores information describing each geofence.

As described in referenced co-pending applications, a reverse DNS model is used to translate from IP address to location, class, and entitlement; whereas an opposite process, a DNS forward model is used to translate from a geofence identification string to an IP address. Since the anchor of the geofence has both an IP address and a geofence identification string that each map to a geocode anchor point, by the definition of geocodes, the geocode anchor point and the geofence area referenced by the geocode anchor point are both geocodes.

In a preferred embodiment, geocodes can be either fixed, mobile, or hybrid. A mobile geocode is encoded as an IP address associated with a mobile device, car, bike, plane, or any other object or device that is operable for mobility. In this embodiment, hybrid geocodes are assigned to non-fixed devices or objects such as things which can be moved but not designed for mobility such as computers, servers, or any objects not fixed to the Earth. Laptops and mobile devices are assigned mobile geocodes. Example uses for mobile and hybrid geocodes are, but are not limited to: inventory management, security, theft detection, notification or alarms based on rules. In a preferred embodiment geocodes are encoded with IPv6 but are not limited to IPv6. Other IP protocols that could be used include IPv4 or IPvX where X is any version of the internet protocol. When a mobile, hybrid, or fixed geocode is a computer, a server, or any device with a microprocessor with implementation of the internet protocol and TCP/IP networking communication stack, the computer's geocoding addressability and assigned dynamic or static IP address are both operable for computer or human addressability and communication. In another embodiment, the fencing agent implements a network protocols such as TCP/IP allowing the device to be addressable as through a geocode which is part of the geofence.

Geofence DNS and Reverse DNS

A preferred embodiment of the reverse DNS model is outlined below. Acronyms include FA (Fencing Agent), DNS (Domain Name Service), DNSSEC (DNS Security), RR (Resource Record), IP (Internet Protocol), TXT (Resource Record of type "text"). In both the forward and reverse DNS model, DNSSEC compliant DNS resolvers will assure the FA of RR authenticity. In this preferred reverse DNS model, an IP address is used to encode location, class, and entitlement data. From FA perspective, steps include (1) determine location, (2) encode location in IP address (preferably IPv6 address), (3) use this address to compute a cell for my (region of interest), (4) DNS query for IPV6 address for the cell, (5) read the list of anchor points from the TXT resource record on the DNS response (anchor points are IPV6 addresses as well), (6) filter anchor points by class (class data is encoded on the IP addresses), (7) DNS query for IPV6 address for the resulting anchor points, (8) read the list of fence points from the TXT RR, (9) compute metadata from the anchor and fence points, (10) build in memory geometry from points, (11) analyze resulting geometry and compute actions based on FA location and metadata. An example includes the following sequence: 2001:4700:f33d:0003:07aa:b18d:03fe:aab3, with 2001:4700:f33d: identifying the network, 0003:07aa:b18d:03fe: identifying the location, and aab3 identifying the metadata.

A preferred embodiment of the forward DNS model is outlined below. Acronyms include FA (Fencing Agent), DNS (Domain Name Service), DNSSEC (DNS Security), RR (Resource Record), IP (Internet Protocol), TXT (Resource Record of type "text"). In both the forward and reverse DNS model, DNSSEC compliant DNS resolvers will assure the FA of RR authenticity. In this preferred forward DNS model, location or metadata could be stored in any DNS resource record (RR) rather than being encoded on the IP address exclusively. A list of Resource Records is available at https://en.wikipedia.org/wiki/List_of_DNS_record_types, and is well-known in the art. From a FA perspective, steps include (1) determine location, (2) use this location to compute a text cell name for my (region of interest), (3) DNS query for the name of the cell, (4) read the list of anchor point names from the TXT resource record on the DNS response, (5) filter anchor points by class (class data is encoded in a CNAME or another RR like TXT, (6) DNS query for the names of the resulting anchor points, (7) read the list of fence points from the TXT RR, (8) compute metadata from the anchor and fence points, (9) build in memory geometry from points, and (10) analyze resulting geometry and compute actions based on FA location and metadata. An example includes the following sequence: 000307aab18d03fe.deadbeef.geofrenzy.com, with 000307aab18d03fe identifying the location, deadbeef identifying the metadata, and geofrenzy.com identifying the domain.

DETAILED DESCRIPTION OF THE FIGURES

Referring now to the figures, they are provided for illustration of the present invention and are not intended to limit the claims thereto.

FIG. 1 is a schematic diagram of an embodiment of the invention illustrating a computer system, generally described as 800, having a network 810, a plurality of computing devices 820, 830, 840, a server 850 and a database 870.

The server 850 is constructed, configured and coupled to enable communication over a network 810 with computing devices 820, 830, 840. The server 850 includes a processing unit 851 with an operating system 852. The operating system 852 enables the server 850 to communicate through network 810 with the remote, distributed user devices. Database 870 houses an operating system 872, memory 874, and programs 876.

In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 is implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 additionally includes components such as a storage device 890 for storing the operating system 892 and one or more application programs 894, a network interface unit 896, and/or an input/output controller 898. Each of the components is coupled to each other through at least one bus 868. The input/output controller 898 receives and processes input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 is a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 1, multiple processors 860 and/or multiple buses 868 are used, as appropriate, along with multiple memories 862 of multiple types (e.g., a combination of a DSP and a microprocessor, a plurality of microprocessors, one or more microprocessors in conjunction with a DSP core).

Also, multiple computing devices are connected, with each device providing portions of the necessary operations (e.g., a server bank, a group of blade servers, or a multi-processor system). Alternatively, some steps or methods are performed by circuitry that is specific to a given function.

According to various embodiments, the computer system 800 operates in a networked environment using logical connections to local and/or remote computing devices 820, 830, 840, 850 through a network 810. A computing device 830 is connected to a network 810 through a network interface unit 896 connected to the bus 868. Computing devices communicate communication media through wired networks, direct-wired connections or wirelessly such as acoustic, RF or infrared through an antenna 897 in communication with the network antenna 812 and the network interface unit 896, which includes digital signal processing circuitry when necessary. The network interface unit 896 provides for communications under various modes or protocols.

In one or more exemplary aspects, the instructions are implemented in hardware, software, firmware, or any combinations thereof. A computer readable medium provides volatile or non-volatile storage for one or more sets of instructions, such as operating systems, data structures, program modules, applications or other data embodying any one or more of the methodologies or functions described herein. The computer readable medium includes the memory 862, the processor 860, and/or the storage media 890 and is a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further transmitted or received over the network 810 via the network interface unit 896 as communication media, which includes a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that are used to store the computer readable instructions and which are accessed by the computer system 800.

It is also contemplated that the computer system 800 does not include all of the components shown in FIG. 1, includes other components that are not explicitly shown in FIG. 1, or utilizes architecture completely different than that shown in FIG. 1. The various illustrative logical blocks, modules, elements, circuits, and algorithms described in connection with the embodiments disclosed herein are implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application (e.g., arranged in a different order or partitioned in a different way), but such implementation decisions should not be interpreted as causing a departure from the scope of the present invention.

Figure 2:
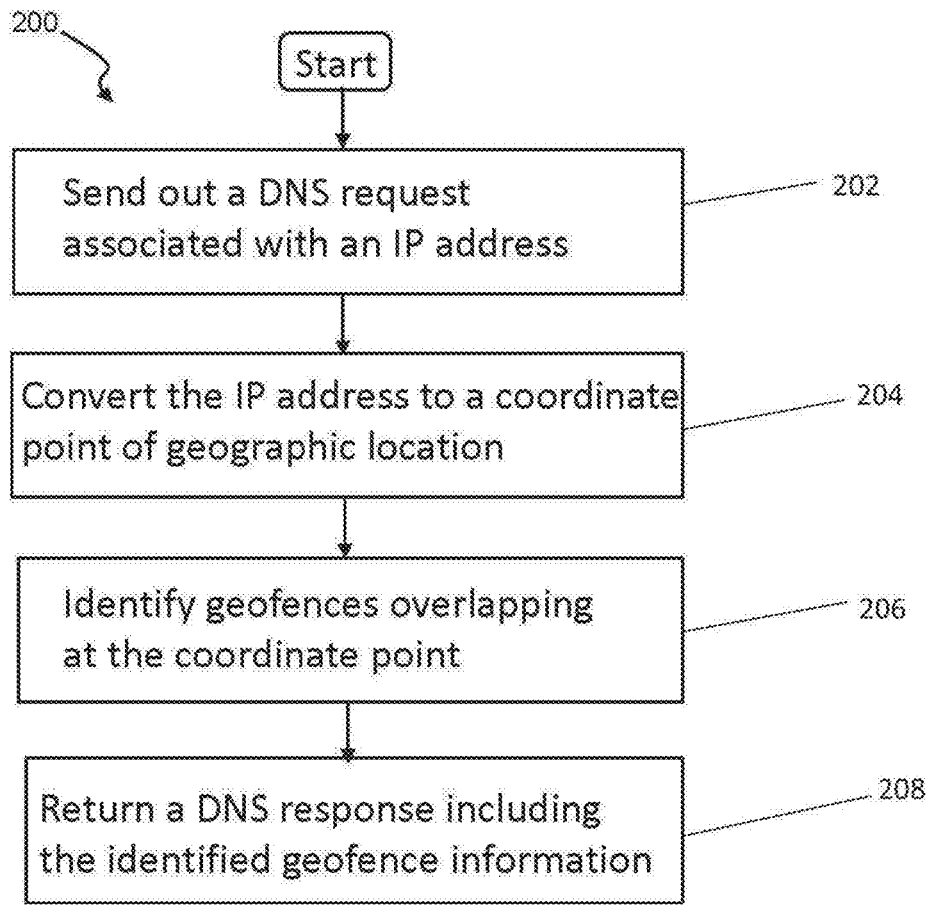
FIG. 2 is a flowchart for delivering geofence information based on a request.

FIG. 2 is a flowchart for delivering geofence information based on a request. A user send out a DNS request associated with an IP address 202. A server converts the IP address to a coordinate point of geographic location and queries a geofence database 204. Then one or more geofences overlapping at the coordinate point are identified 206. The server then returns a DNS response including information describing the identified one or more geofences 208.

Figure 3:
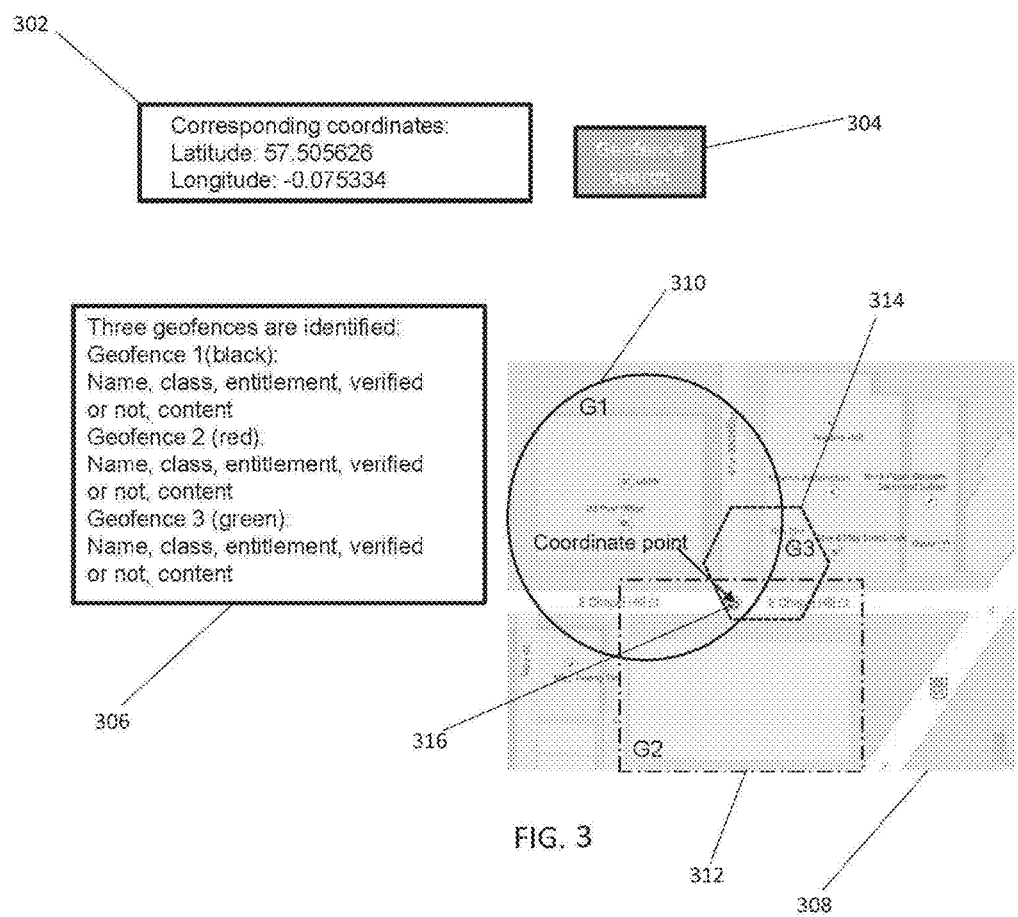
FIG. 3 is one embodiment of a graphical user interface (GUI) for a latitude/longitude geofence search, showing a list of geofences and corresponding information.

FIG. 3 is an embodiment of GUI for the geofence delivery network. A user enters latitude and longitude values in a box on the GUI 302, and then selects the button "Geofence search" 304. Then, all the identified geofences are identified and listed on the GUI with corresponding information 306. There is also an interactive map displaying the identified geofences 308. In this illustrated example, there are three geofences identified. Their name, class, entitlement, verification, and content information are displayed accordingly. In the interactive map, boundaries of the three geofences G1 (black) 310, G2 (green) 312, and G3 (red) 314 are differentiated with different line types. Meanwhile, the converted coordinate point 316 is also noted in the map.

Figure 4:
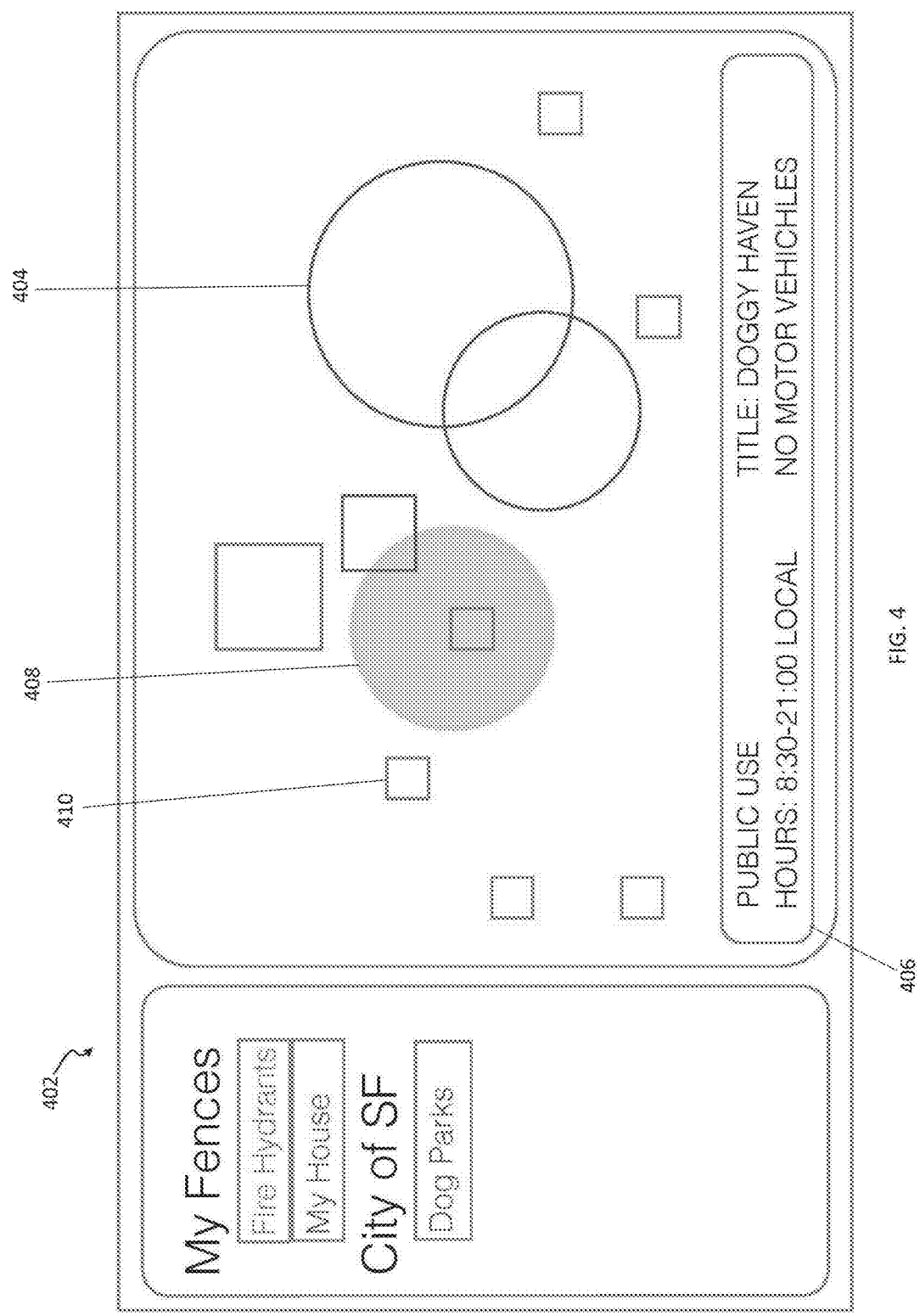
FIG. 4 illustrates one embodiment of a GUI for fence delivery network, including several options of defining a geofence, including defining the geofence by real property boundaries, defining the geofence by the radius around a beacon, defining the geofence by the perimeter of a building.

FIG. 4 illustrates one embodiment of a GUI for fence delivery network 402, including several options of defining a geofence, including defining the geofence by real property boundaries, defining the geofence by the radius around a beacon, defining the geofence by the perimeter of a building. By way of example and not limitation, a use case for identifying geofences associated with Dog Parks is shown, indicating the locations of the Dog Parks 404 based upon the City of SF, and public use hours and restrictions 406 are also indicated. Also illustrated are My Fences, which in this use case include the user's home geofence (My House) 408 and Fire Hydrants 410. All of these are automatically indicated with geographic proximity to each other and visually represented in 2-D map view on the GUI of the user's mobile device. Preferably, the geofences associated with Dog Parks, the user's home geofence, and the geofences associated with Fire Hydrants are each represented by a different color in the GUI, wherein the color is either the outline or partial of a geofence or the geofence is filled in with the color. In an exemplary embodiment, fire hydrants are represented with red, the home geofence is represented with blue, and the dog parks are represented with green. In another embodiment, the geofences associated with Dog Parks, the user's home geofence, and the geofences associated with Fire Hydrants are each represented by different figures. Preferably, each distinct type of fence is represented with a different shape and/or a different outline of the shape. In 4, the Dog Parks are represented by the two overlapping non-filled circles and the square partially overlapping the filled circle; My House is represented by the square above the filled circle which does not overlap the filled circle; and the Fire Hydrants are represented by the remainder of the squares.

Figure 5A:
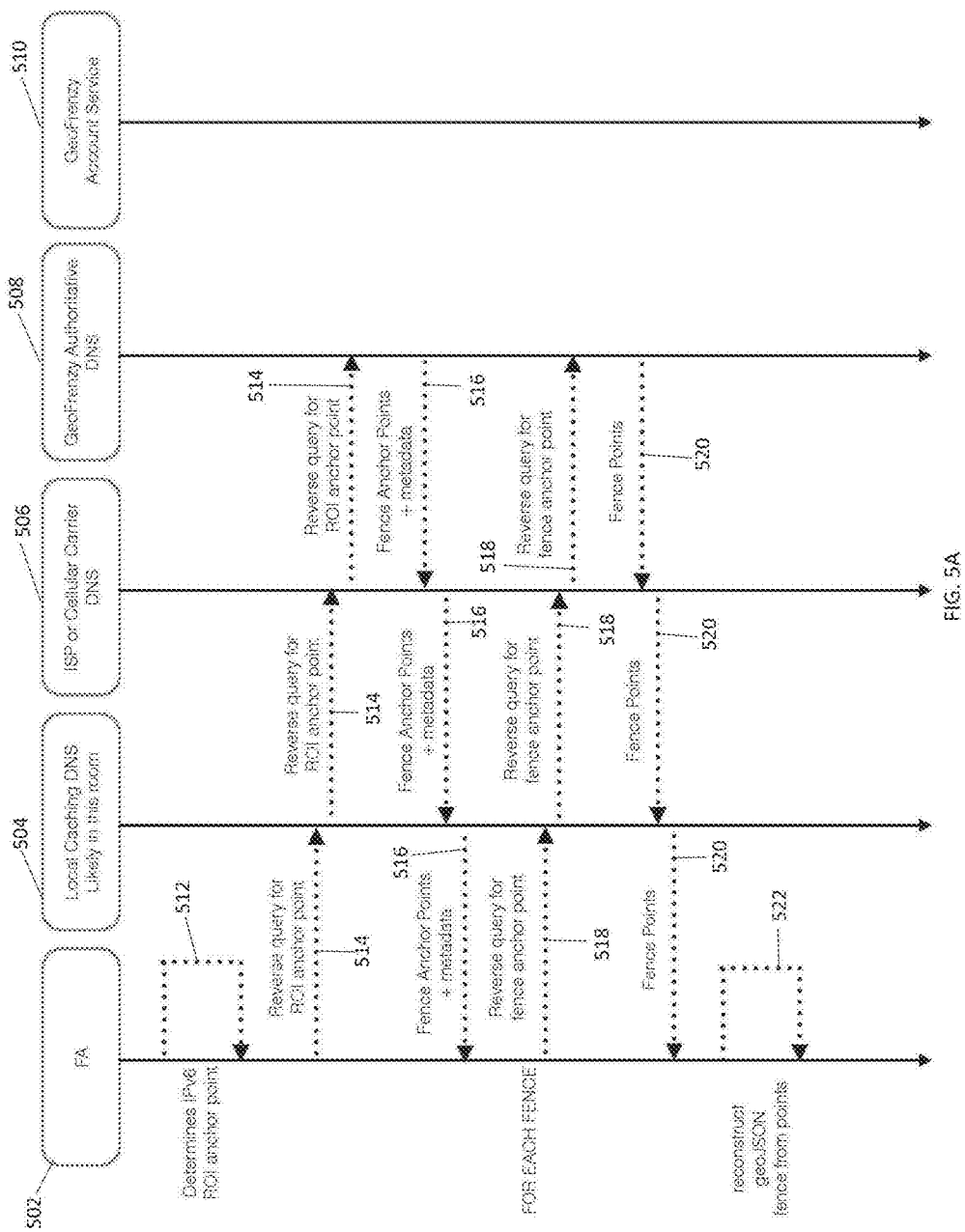
FIGS. 5A & 5B show a flowchart illustrating steps for querying a geofence database.
Figure 5B:
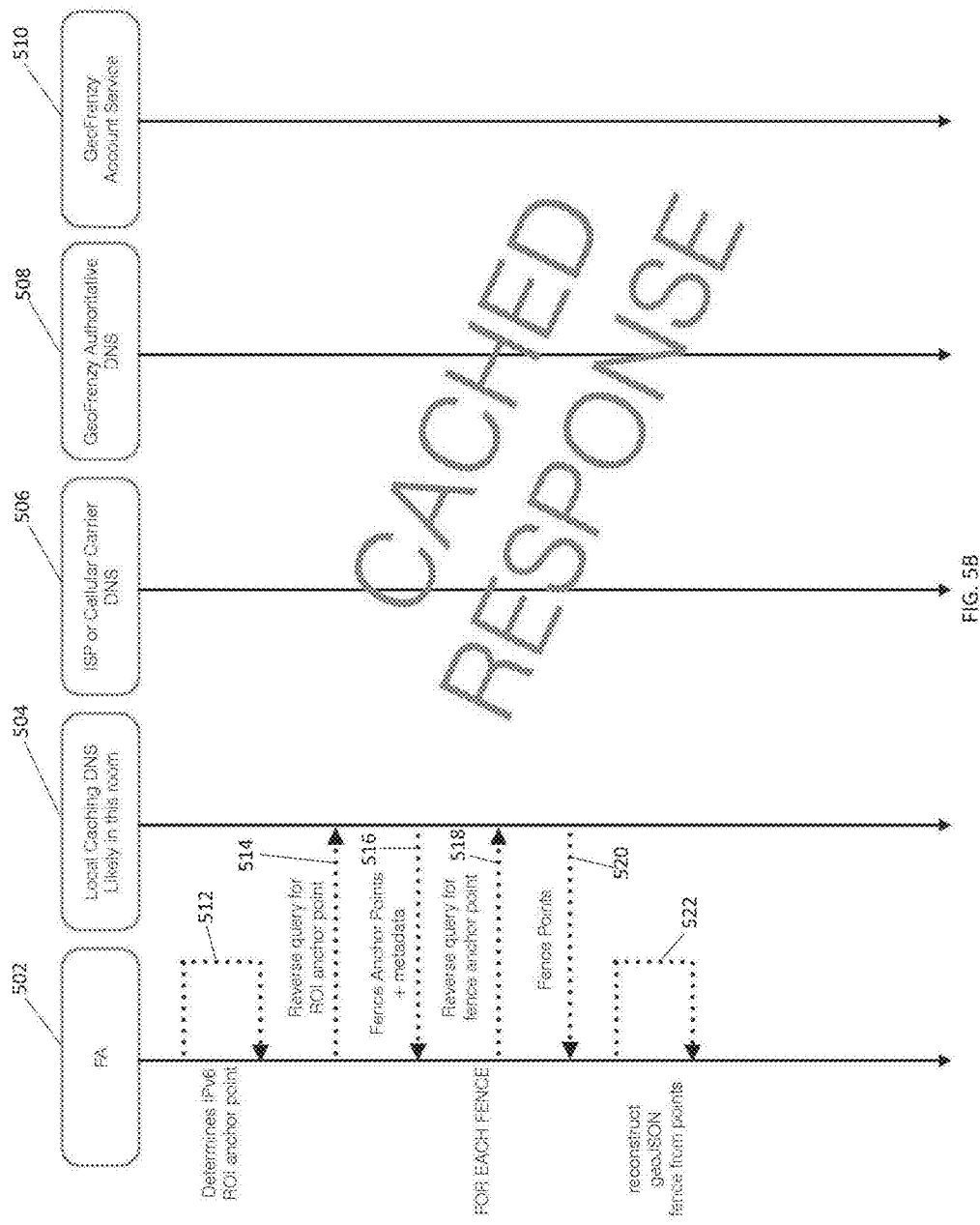

FIGS. 5A & 5B show a flowchart illustrating steps for querying a geofence database. The FIG. 5A flowchart includes an FA 502, a Local Caching DNS 504, an ISP or Cellular Carrier DNS 506, an Authoritative DNS 508, and an Authoritative Account Service 510. Steps include determines IPv6 ROI anchor point 512, Reverse query for ROI anchor point 514, Fence Anchor Points+metadata 516, Reverse query for fence anchor point 518, Fence Points 520, and reconstruct geoJSON fence from points 522. FIG. 5B is a cached response for steps for querying a geofence database.

Figure 6:
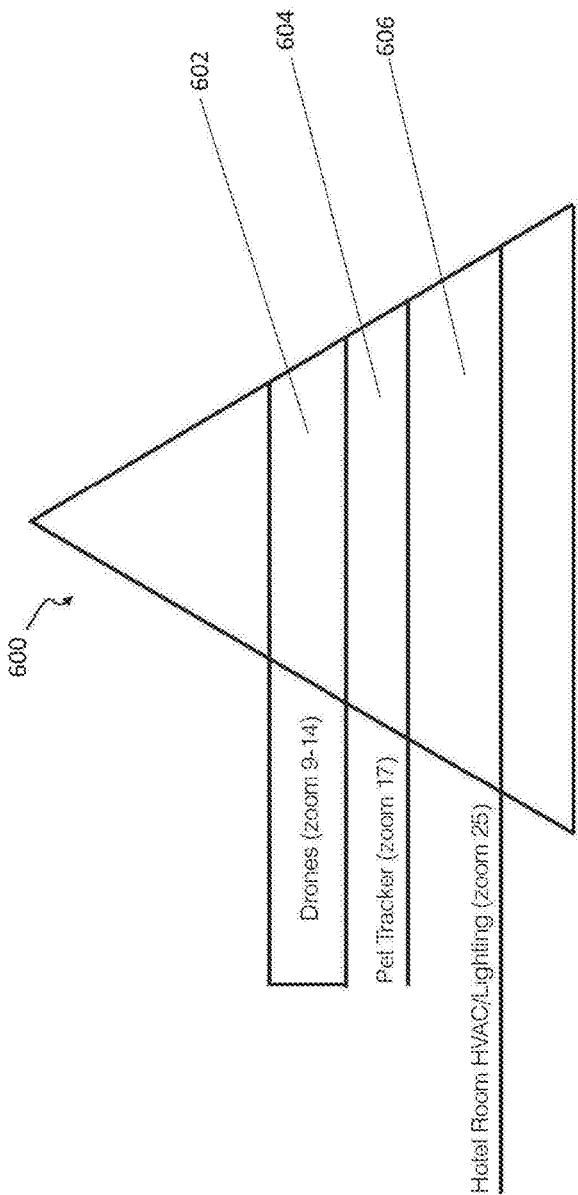
FIG. 6 is a diagram illustrating zoom level to class binding when using a pyramid projection.

FIG. 6 is a diagram illustrating zoom level to class binding when using a pyramid projection 600. As shown, Drones are provided on a zoom level 9-14 602; Pet Tracker is provided on a zoom level 17 604; and Hotel Room HVAC/Lighting is provided on a zoom level 25 606. In a current pyramid projection according to the present invention, the highest order bits of IP addresses are used to represent a location the lower order bits are used to express metadata such as fence classes, entitlements, and lookup table identifiers (for the purpose of redefining the metadata bits in the future). In other embodiments, the metadata are expressed on any aspect of DNS or IP, such as DNS RR (resource records), certificates, keys or IPv6 scopes. In a current pyramid projection according to the present invention, there are trillions of potential bits to be used as metadata in every square millimeter of location. These bits, when set to 1 will represent an intersection of class, entitlements and lookup table for this square centimeter location.

Figure 7:
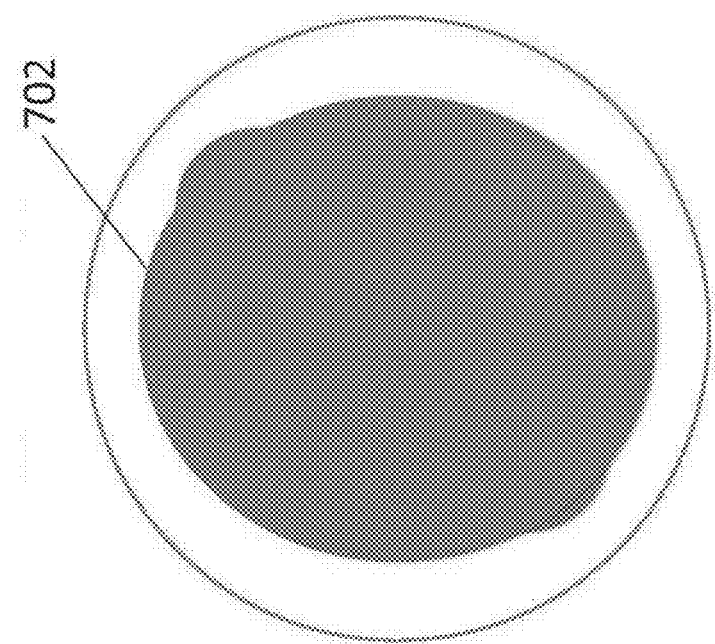
FIG. 7 illustrates a 3-D model overview.

FIG. 7 illustrates a 3-D model overview illustrating how the surface of the Earth is not a perfect sphere 702; however, as provided by the present invention, a sphere map is generated automatically consisting of points that are represented by IPv6 addresses that superficially wrap around or cover the Earth such that the sphere map encompasses the highest features to represent or approximate the Earth's surface for use with the present invention generation of geofences registry, lookup, categorization within at least one database for geofences.

Figure 8:
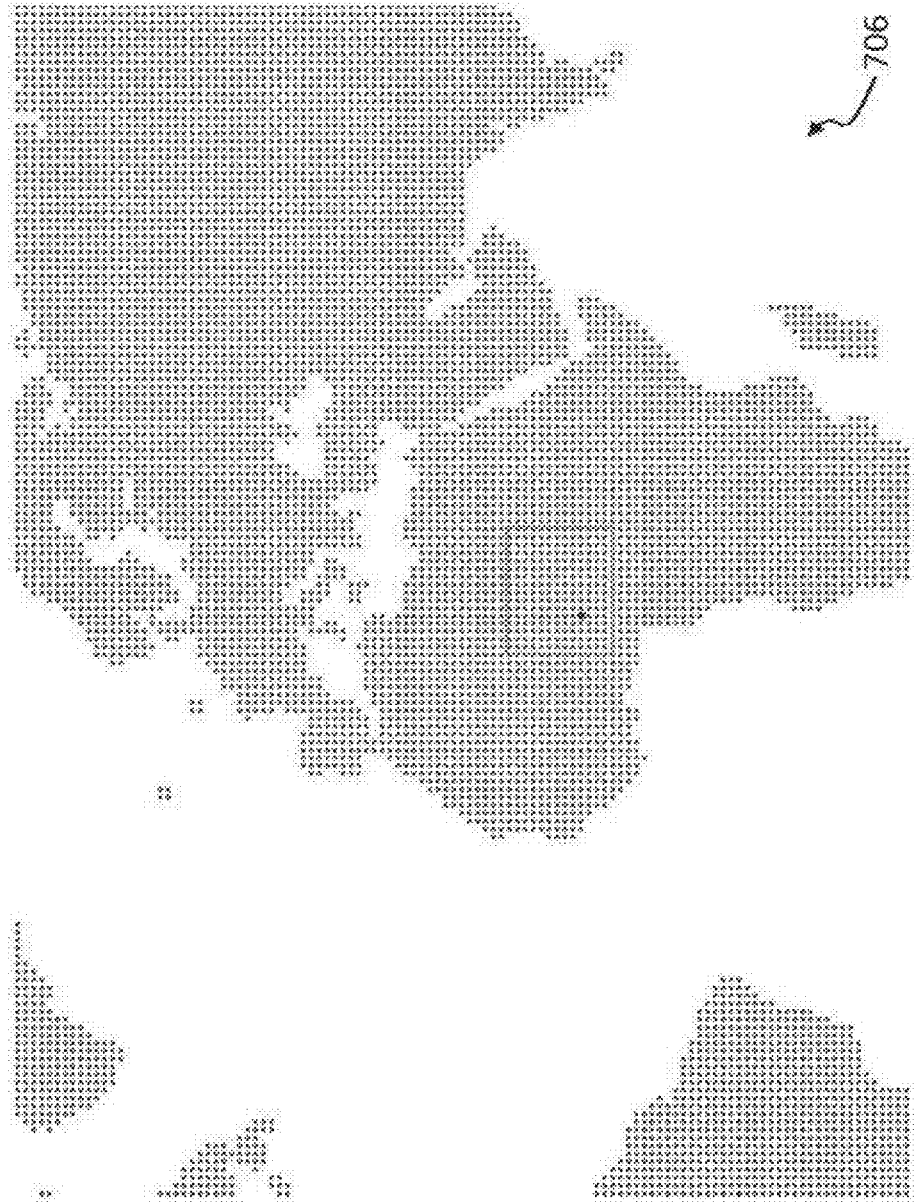
FIG. 8 is a 2-D model overview.

FIG. 8 is a 2-D model overview illustrating another view of mapping the earth 706 for providing visualization of geofences according to the present invention.

Figure 9:
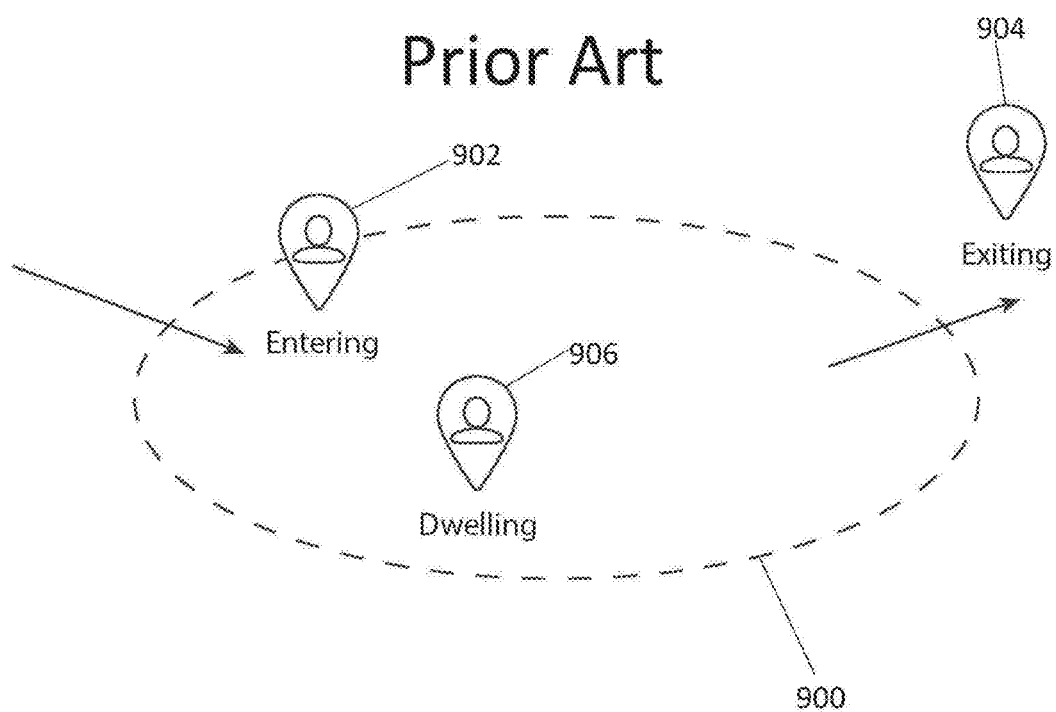
FIG. 9 is a PRIOR ART schematic diagram for geofencing solutions.

FIG. 9 is a PRIOR ART schematic diagram for geofencing solutions. Current prior art geofencing solutions are generally based on centroid fences and the data emitted by the location service frameworks consists of simple messages containing the fence identification (ID) and a notice of entry 902, exit 904, or dwelling 906 inside of the fence 900.

Figure 10:
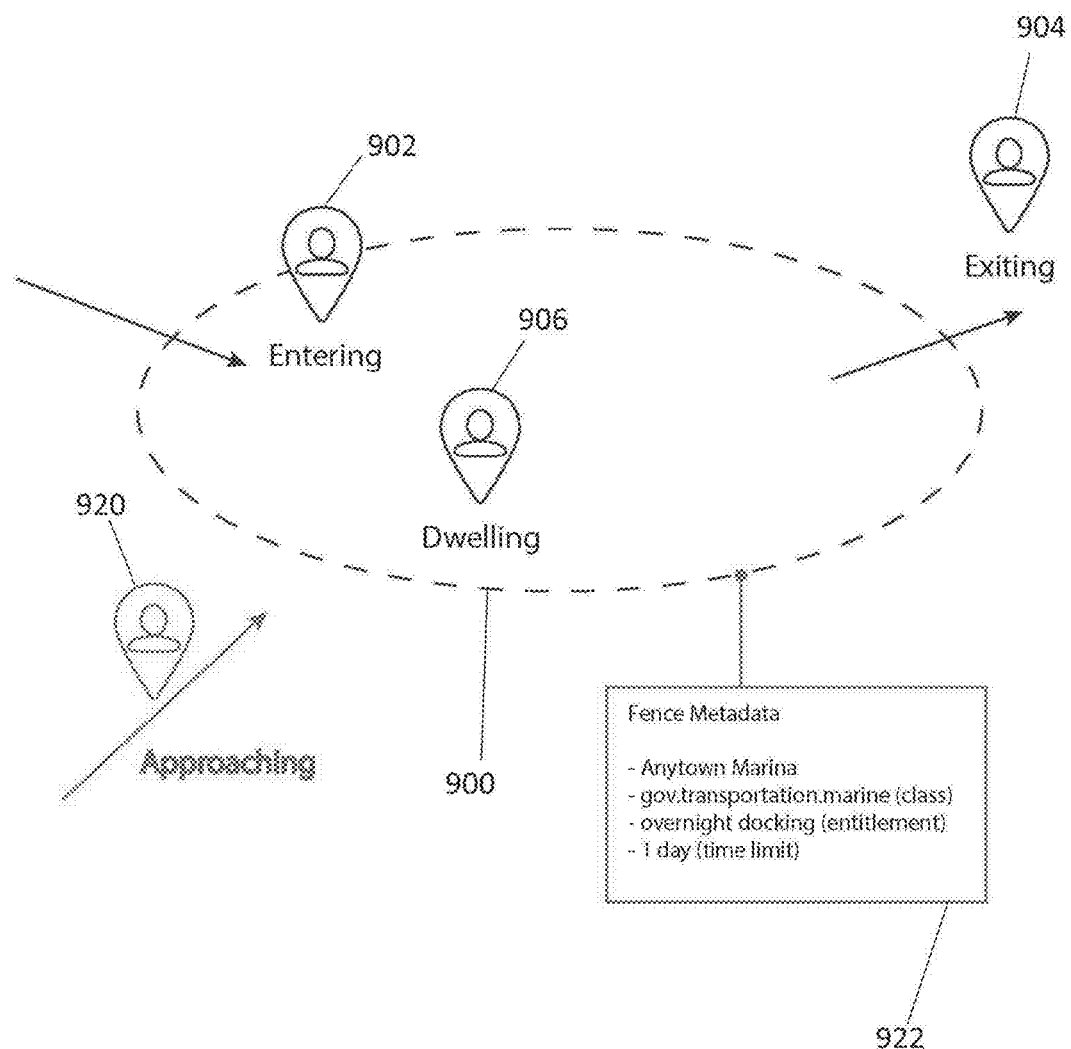
FIG. 10 is a schematic diagram for geofencing solutions according to the present invention.

FIG. 10 is a schematic diagram for geofencing solutions according to the present invention. By contrast and differentiation from prior art, the present invention provides for augmentation of messaging. The approaching 920, entering 902, exiting 904, and dwelling 906 messages are augmented with metadata describing the ownership and purpose of a geofence through a hierarchy of classes 922. The purpose of a geofence is defined to include the intended and/or allowed use of services inside or within the geofence boundaries, which are expressed through a system of entitlements that are received as inputs and stored in the at least one geofence database and associated with the geofence data.

Figure 11:
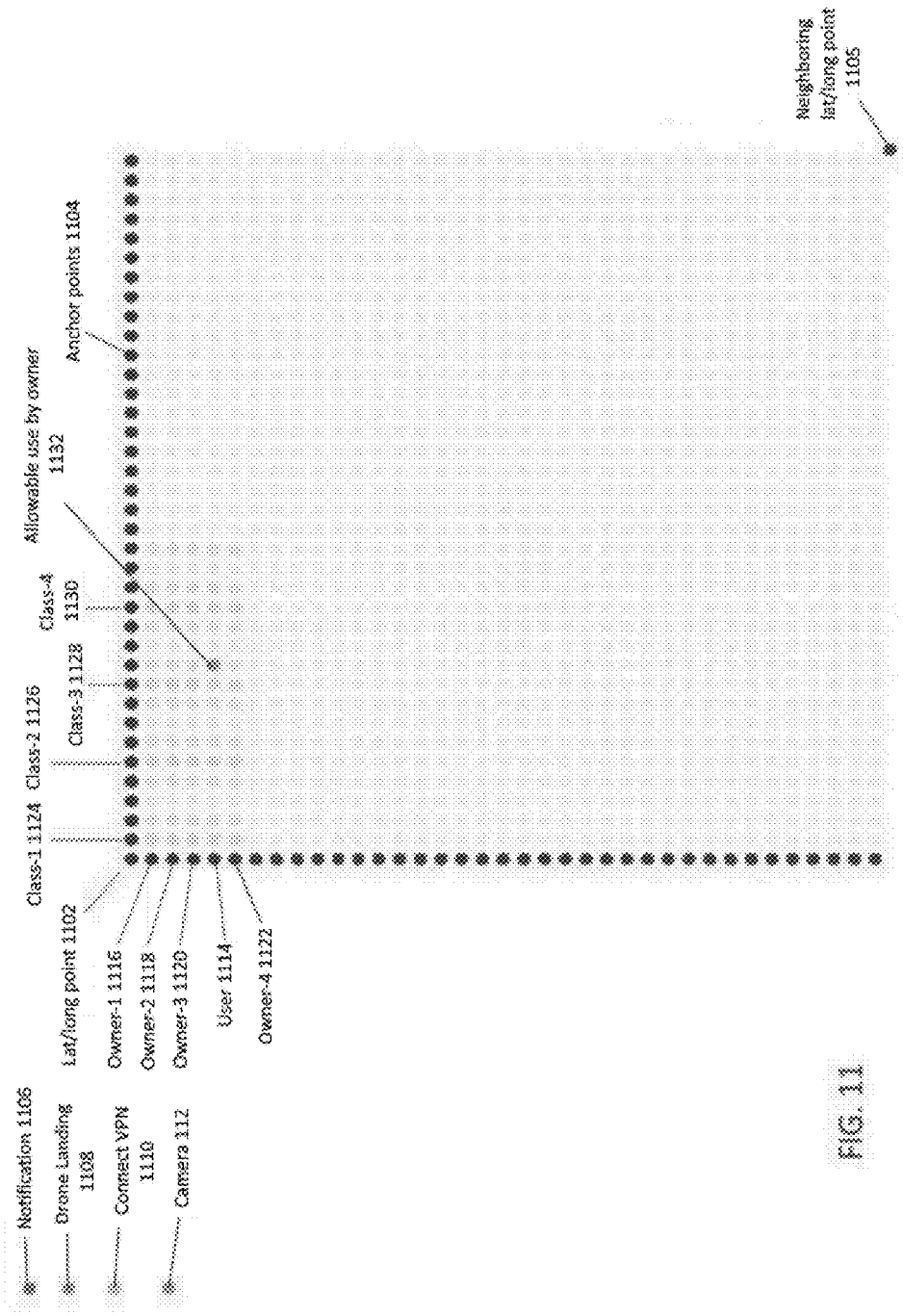
FIG. 11 is a schematic diagram illustrating the encoding of a class and entitlement on an IPv6 address.

FIG. 11 is a schematic diagram illustrating the encoding of a class and entitlement on an IPv6 address. While this illustration is oversimplified, its depiction of encoding of a class and entitlement on an IPv6 address is extended to provide for billions of positions per location. The lat/long point 1102 is the edge of a floating bit boundary; the dots 1104 represent the anchor points that the systems and methods of the present invention use for metadata rather than for location. The neighboring lat/long point 1105 is the next usable point under which the depicted and described process starts again (or repeats). Significantly, there is only one bit of metadata for each anchor point, but there are multiple points for each geofence, according to the present invention; this provides for and allows multiple classes and/or entitlements to be expressed and associated with each geofence. In the example case used for this FIG. 11, four example entitlements are illustrated: Notification 1106, Drone Landing 1108, Connect VPN 1110, and Camera 1112; they have corresponding colorized points, respectively: red, green, yellow, and blue. In FIG. 11, the possible entitlements are organized in lines of dots, with a darker dot indicating that the entitlement is allowed for that latitude and longitude. In another embodiment, the entitlements. The example case is provided for illustration purposes only, and does not intend to limit the claimed invention thereto; the example case shows a user (Jenny/Jenny's Flowers) 1114 who would like to allow delivery drones to land for pickup and dropoff inside a predetermined geofence having an anchor point at lat/long as illustrated. Each point is a neighboring lat/long point; Owner 1 1116, Owner 2 1118, Bob's Tacos 1120, Jenny's Flowers 1114, and John Jones 1122 are all indicated in this example as geofence owners; Class 1 1124, Class 2 1126, Flower Shops 1128, and John's house 1130 are all indicated as geofence classes associated with the indicated example entitlements. The green point 1132 activated for Jenny's Flowers user/owner and for Flower Shops that allows for the entitlement of Drone Landing (green point 1132) is highlighted to indicate an intended or allowable use of that geofence by the geofence owner. The lighter dots surrounding the darker point represent prospective entitlements which have not been allowed for Notification, Drone Landing, Connect VPN, and Camera.

Figure 12:
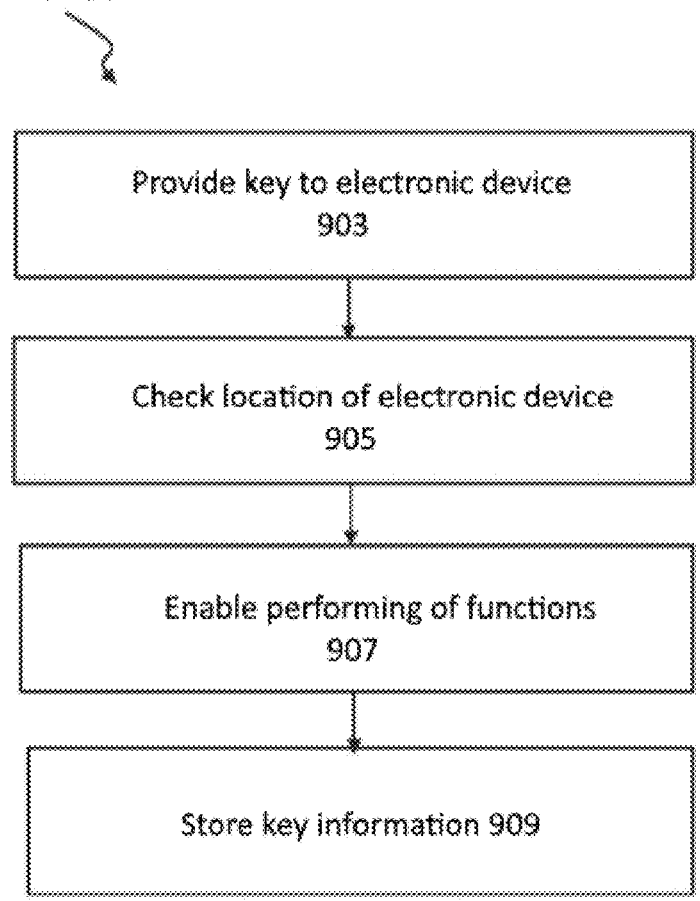
FIG. 12 is a flowchart for managing permissions associated with real estate for electronic devices.

FIG. 12 is a flowchart for managing permissions associated with real estate for electronic devices. The method 901 includes the steps of providing a key associated with real property boundaries to at least one electronic device 903, determining that a location of the at least one electronic device is on the real property boundaries or within the real property boundaries 905, and allowing the at least one electronic device to perform a function on the real property boundaries or within the real property boundaries 907. Optionally, step 909 is performed, which includes the step of storing identifying information for the key associated with real property boundaries and identifying information for the at least one electronic device in a real estate titles and permissions platform. In one embodiment, a server performs steps 903-909. In another embodiment, steps 903-909 are performed by various network elements from FIG. 1.

Figure 13:
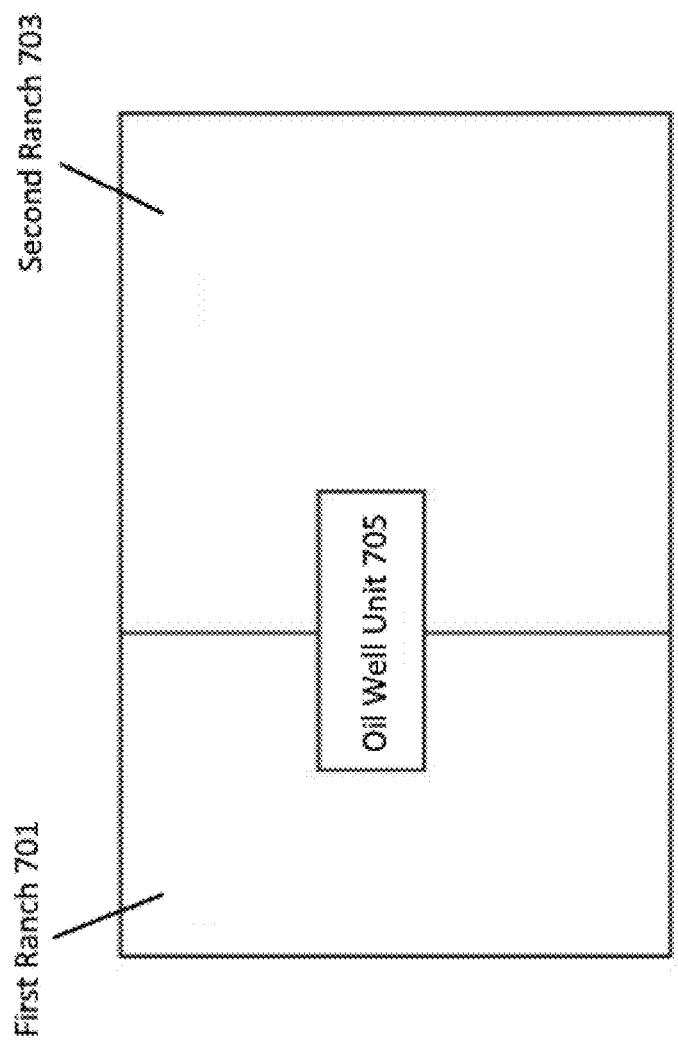
FIG. 13 is a diagram illustrating undivided mineral interests in two ranches.

FIG. 13 is a diagram illustrating undivided mineral interests in two ranches. A first ranch 701 includes an oil and gas lease owned by one company. A second ranch 703 includes an oil and gas lease owned by another company. An oil well unit 705 represents a 40 acre oil unit and the area drained. Geofences are constructed around the oil well unit 705 in accordance with the disclosure herein and the disclosures of U.S. application Ser. Nos. 14/728,259, 14/745,951, 14/755, 669 and 14/740,557. The estates in FIG. 13 include surface, mineral, and term leasehold estates. Revenue from production and sale of oil flows electronically based upon an application which simply distributes contract percentages under the systems and methods of the present invention. The operator owns the oil well, so revenue has to flow to the oil company who owns the well, the owners of the leases on the two ranches 701 and 703, overriding royalty owners who are not mineral owners, mineral owners based upon their percentage under the two ranches 701 and 703 based upon the drainage of the oil unit area, and at least two surface owners of the two ranches 701 and 703 who have a contract with the oil company to clean up the surface area. By converting the title of the surface estate, mineral estate, term leasehold estate, and other royalty assignments using the systems and methods of the present disclosure and those disclosed in U.S. application Ser. Nos. 14/728,259, 14/745,951, 14/755, 669 and 14/740,557, the network application simplifies the payments to all parties by defining the boundaries using IP addresses.

By way of definition and description supporting the claimed subject matter, preferably, the present invention includes communication methodologies for transmitting data, data packets, messages or messaging via a communication layer. Wireless communications over a network are preferred. Correspondingly, and consistent with the communication methodologies for transmitting data or messaging according to the present invention, as used throughout this specification, figures and claims, wireless communication is provided by any reasonable protocol or approach, by way of example and not limitation, Bluetooth, Wi-Fi, cellular, Zig-Bee, near field communication, and the like; the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard(s), the term "WiMAX" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMAX, other communications protocols are used, including but not limited to a "1G" wireless protocol such as analog wireless transmission, first generation standards based (IEEE, ITU or other recognized world communications standard), a "2G" standards based protocol such as "EDGE or CDMA 2000 also known as 1×RTT", a 3G based standard such as "High Speed Packet Access (HSPA) or Evolution for Data Only (EVDO), any accepted 4G standard such as "IEEE, ITU standards that include WiMAX, Long Term Evolution "LTE" and its derivative standards, any Ethernet solution wireless or wired, or any proprietary wireless or power line carrier standards that communicate to a client device or any controllable device that sends and receives an IP based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments of the invention described herein comprises one or more conventional processors and unique stored program instructions that control the one or more processors to implement, in conjunction with certain non-processor circuits, some, most, or all of the functions for the systems and methods as described herein. The non-processor circuits include, but are not limited to, radio receivers, radio transmitters, antennas, modems, signal drivers, clock circuits, power source circuits, relays, current sensors, and user input devices. As such, these functions are interpreted as steps of a method to distribute information and control signals between devices. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Certain modifications and improvements will occur to those skilled in the art upon a reading of the foregoing description. In an alternate embodiment of the systems and methods of the present invention, any encoding of geocodes is used and forward records instead of using IP addresses as described in the foregoing preferred embodiments. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A geocode delivery system, comprising:
   at least one device having a graphical user interface (GUI), and a processor coupled with a memory, constructed and configured for wireless communication and programmed to include a fencing agent operable to send a request for geofence information over a network to at least one server computer associated with at least one geofence;
   a plurality of geocodes linked to the at least one geofence and assigned a plurality of unique Internet Protocol (IP) addresses or a plurality of unique Internet Protocol version 6 (IPv6) addresses;
   at least one geofence database, wherein the at least one geofence database stores information describing the at least one geofence;
   wherein the at least one geofence includes an anchor point identified by one of the plurality of unique IP addresses or one of the plurality of unique IPv6 addresses;
   a Domain Name Service (DNS), wherein a domain name is assignable to each unique IP address or unique IPv6 address for each of the plurality of geocodes and/or the anchor point of the at least one geofence;
   wherein the domain name is automatically generated in DNS and registered with the anchor point of the at least one geofence;
   wherein the domain name is comprised of a plurality of words, wherein the plurality of words are translatable to a geographic designator;
   wherein the GUI is operable to display a DNS response to the request in real-time or near real-time;
   wherein the plurality of geocodes are translatable to coordinate points of a geographic location and the IP address or the IPv6 address;
   further comprising subdomain names and domain names assigned to the plurality of geocodes and the at least one geofence, wherein the domain names and/or the subdomain names dereference to the at least one geofence when one of the plurality of geocodes is registered as the anchor point; and
   wherein a plurality of metadata are linked to one of the plurality of geocodes, wherein the plurality of metadata includes, classes, entitlements, and lookup table identifiers, wherein the plurality of metadata are operable to be redefined via the lookup table identifiers, wherein the plurality of metadata are distributed in response to forward DNS queries and/or reverse DNS queries.

2. The system of claim 1, further comprising a search engine configured to receive the request from the at least one device over the network and identify whether a searched geocode is within the at least one geofence, wherein the plurality of geocodes are directly translated to coordinate points through a lookup table or indirectly translated in real-time to coordinate points through a third party algorithm, and wherein the plurality of geocodes which make up the at least one geofence are application specific.

3. The system of claim 1, wherein at least one real estate title and at least one permission are linked to at least one real property boundary, wherein the at least one real property boundary is not defined by the user, wherein the at least one real property boundary includes the at least one geofence or the plurality of geocodes within the at least one geofence, wherein the at least one real property boundary is linked to the at least one geofence or is linked to the plurality of geocodes within the at least one geofence through one of the plurality of unique IP addresses or one of the plurality of unique IPv6 addresses, wherein the at least one real estate title or the at least one permission has at least one owner.

4. The system of claim 1, wherein the anchor point is an anchor geocode, wherein the anchor geocode or any of the plurality of geocodes is addressed through a plurality of subdomain names linked to the domain name, wherein the plurality of subdomain names linked to the domain name are comprised of a plurality of words, wherein the anchor geocode is associated with an IP address that relates the domain name of the geofence to the anchor point, wherein the anchor geocode dereferences to the geofence when the geofence has registered the geocode as the anchor geocode.

5. The system of claim 1, wherein the plurality of geocodes are stored as metadata utilizing IPv6 and DNS.

6. The system of claim 1, wherein the plurality of geocodes are stored in a DNS Resource Record (RR) defining as points for the at least one geofence referenced by the anchor point for the at least one geofence and/or an anchor geocode.

7. The system of claim 1, wherein the plurality of geocodes are fixed, mobile, or hybrid; wherein the plurality of mobile geocodes are encoded as an IP address associated with a device operable for mobility; wherein the plurality of hybrid geocodes are encoded as an IP address associated with a non-fixed device.

8. The system of claim 1, further comprising a geofence manager module; wherein the geofence manager module implements rules on the at least one device; wherein the geofence manager module is operable to confirm and/or activate at least one license associated with the at least one geofence in the at least one geofence database.

9. The system of claim 1, wherein the fencing agent implements a network protocol enabling the at least one device to be addressable through the plurality of geocodes linked to the at least one geofence.

\* \* \* \* \*